C. ARNESEN.
STRAINER.
APPLICATION FILED JULY 5, 1910.
1,003,410.
Patented Sept. 19, 1911.
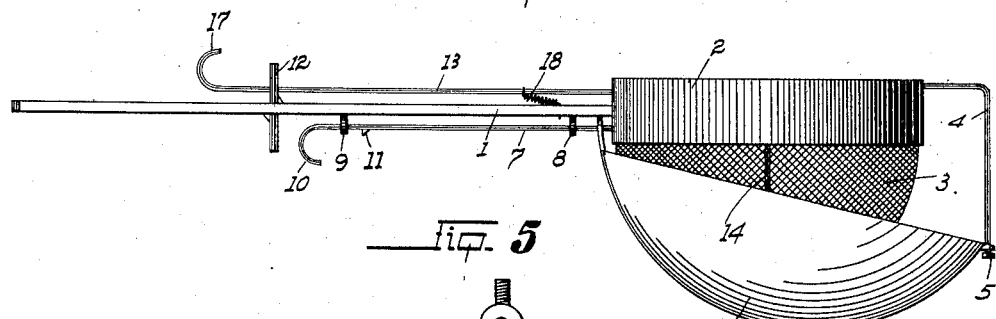
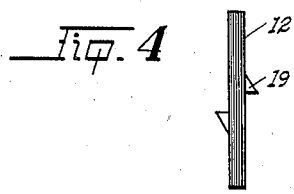
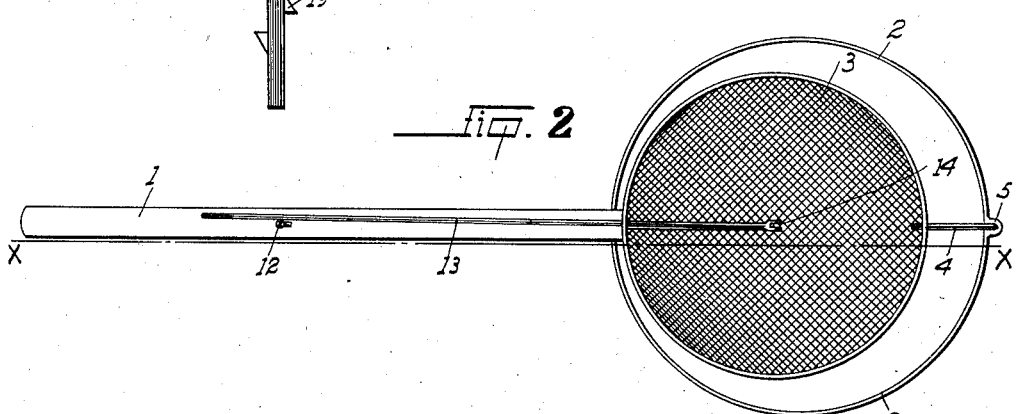
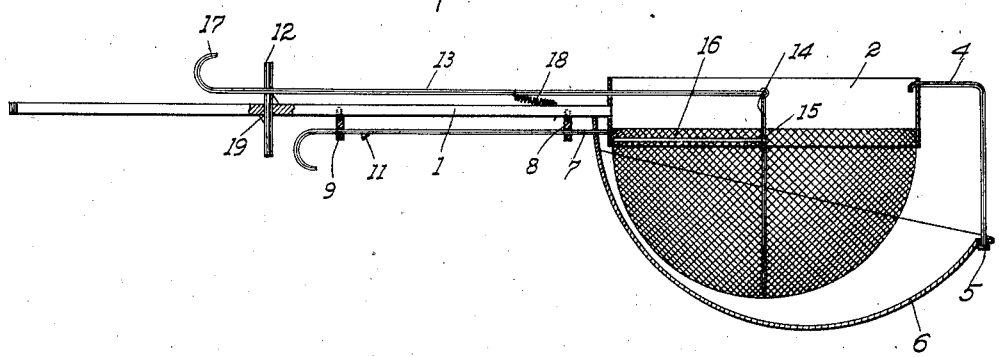
Witnesses
Frank H. Carter
Cara B. Carter
Inventor
Charlotte Arnesen
Percy G. Webster
Attorney
COLUMBIA PLANOGRAPH CO., WASHINGTON, D. C.

UNITED STATES PATENT OFFICE.

CHARLOTTE ARNESEN, OF PORTLAND, OREGON.

STRAINER.

1,003,410. Specification of Letters Patent. Patented Sept. 19, 1911.

Application filed July 5, 1910. Serial No. 570,273.

*To all whom it may concern:*

Be it known that I, CHARLOTTE ARNESEN, a citizen of the United States, residing at Portland, county of Multnomah, and State of Oregon, have invented certain new and useful Improvements in Strainers; and I do declare the following to be a full, clear, and exact description of the same, such as will enable others skilled in the art to which it appertains to make and use the same, reference being had to the accompanying drawings, and the characters of reference marked thereon, which form a part of this application.

This invention relates to improvements in kitchen paraphernalia and particularly to strainers, the object of the invention being to produce such a strainer as will not drip after use and one which will be readily and easily cleaned and also one which will be exceedingly easy to operate in that it is provided with an agitating or stirring device and also permits of a take down of parts in a quick and effective manner when it is desired to clean the strainer.

A further object of the invention is to produce a simple and inexpensive device and yet one which will be exceedingly effective for the purposes for which it is designed.

These objects I accomplish by such structure and relative arrangement of parts as will appear by a perusal of the following specification and claims.

In the drawings similar characters of reference indicate corresponding parts in the several views.

Figure 1 is a side elevation of the complete strainer. Fig. 2 is a top plan view of the same. Fig. 3 is a sectional view taken on a line $x$—$x$ of Fig. 2. Fig. 4 is a side view of a guide rod. Fig. 5 is a front elevation of a guide for a rod.

Referring now more particularly to the characters of reference on the drawings 1 designates the main handle of the strainer having an outer ring 2 to which is secured in a suitable manner the strainer net 3. Secured at the outer end of the ring 2 is an outwardly and downwardly projecting rod 4 on the lower end of which as at 5 is pivotally secured or swiveled a bottom cup like receptacle 6 supported at its other side on a rod 7 movable through said member 6 and held in eye like guides 8 and 9 on the under side of the handle 1, such rod 7 have an outer operating handle member 10 and a stop member 11 to limit its motion to prevent it from coming out of the guides 8 and 9. By operating the handle 10 to move the rod 7, such rod 7 may be disengaged from the receptacle 6 thus permitting such receptacle 6 to fall clear of the strainer net 3 and to be turned away therefrom for cleaning or the like purposes or to permit the strainer to be used without such receptacle 6. When used however this receptacle 6 catches all the drippings after the using of the strainer and thus the strainer can be laid aside after use without danger of soiling the surface on which it is placed as all liquid would be caught and held in said receptacle.

In conjunction with this strainer and catch receptacle I use a stirring or agitating means consisting of a pin or rod 12 through which is a rod 13 also movable through the ring 2 and linked at its outer end to an agitating finger member 14 movable through the interior of the net 3 and pivotally fulcrumed at 15 to a supporting rod 16 projecting into the net 3 from the ring 2. To operate this agitating finger 14 a finger member 17 on the rod 13 is operated to pull this rod 13 back and then a spring 18 connected to said rod 13 and said handle 1 pulls this rod 13 back again which action causes the finger member 14 to move back and forth in the net 3 thus stirring and agitating the contents thereof. The member 12 has stops or lugs 19 to maintain its proper position in the handle 1.

The strainer may be constructed without the receptacle 2 or also without the stirring or agitating means as desired. Or if desirable both of these may be used together or not just as may be found most convenient.

From the foregoing description it will readily appear that I have produced such a strainer as substantially fulfils the objects of the invention as set forth herein.

While this specification sets forth in detail the present and preferred construction of the device still in practice such deviations from such detail may be resorted to as do not form a departure from the spirit of the invention.

Having thus described my invention, what I claim as new and useful and desire to secure by Letters Patent, is:

1. A strainer comprising a handle member, a ring on said handle member, a strainer mounted on said ring, a projecting arm on said ring, a cup member swiveled on said arm, slotted guides on said handle member, a rod movable through said guides and through said cup member and a stop member on said rod to limit its movement through said slotted guide, as described.

2. A device of the character described comprising the combination of a handle member, a vertical guide through said handle member, a ring on the outer end of said handle member, a strainer on said ring, an agitating finger member mounted in said strainer, a spring pulled rod projecting through said vertical guide and linked to said agitating finger member, an outwardly and downwardly projecting arm on said ring, a cup swiveled on said arm beneath said strainer, slotted guides on the under side of said handle member, a rod movable through said guides and said cup member, and a stop member on said rod to limit its movement through said guides, as described.

In testimony whereof I affix my signature in presence of two witnesses.

CHARLOTTE ARNESEN.

Witnesses:
BERTHINE MATHISON,
FRED H. WHITFIELD.

---

Copies of this patent may be obtained for five cents each, by addressing the "Commissioner of Patents, Washington, D. C."